United States Patent [19]

Inamoto et al.

[11] Patent Number: 4,688,052
[45] Date of Patent: Aug. 18, 1987

[54] LIQUID JET RECORDING HEAD HAVING A LAYER OF A RESIN COMPOSITION CURABLE WITH AN ACTIVE ENERGY RAY

[75] Inventors: Tadayoshi Inamoto, Machida; Hiromichi Noguchi; Megumi Munakata, both of Atsugi, all of Japan

[73] Assignee: Canon Kabushiki Kaisha, Tokyo, Japan

[21] Appl. No.: 883,349

[22] Filed: Jul. 8, 1986

[30] Foreign Application Priority Data

Jul. 13, 1985 [JP] Japan .............................. 60-153353
Jul. 13, 1985 [JP] Japan .............................. 60-153355

[51] Int. Cl.$^4$ ............................................. G01D 15/18
[52] U.S. Cl. .............................. 346/140 R; 522/31; 522/14; 522/102; 156/668; 430/281
[58] Field of Search ............... 346/140; 522/14, 102, 522/95, 31

[56] References Cited

U.S. PATENT DOCUMENTS

| | | | |
|---|---|---|---|
| 4,412,224 | 10/1983 | Sugitani | 346/140 X |
| 4,509,063 | 4/1985 | Sugitani | 346/140 |
| 4,521,787 | 6/1985 | Yokota | 346/140 |

*Primary Examiner*—Joseph W. Hartary
*Attorney, Agent, or Firm*—Fitzpatrick, Cella, Harper & Scinto

[57] ABSTRACT

A light jet recording head has a liquid passage communicated to the discharging outlet of the liquid provided on a substrate surface, said passage being formed by subjecting a layer of a resin composition curable with an active energy ray to a predetermined pattern exposure with the use of said active energy ray to thereby form a cured region of said resin composition and removing the uncured region from said layer, said resin composition comprising:

(i) a linear polymer having a glass transition temperature of 50° C. or higher and a weight-average molecular weight of about $3.0 \times 10^4$ or more; and (ii) an epoxy resin comprising at least one compound having two or more epoxy groups in the molecule, the epoxy groups existing in said epoxy resin being partially esterified with an unsaturated carboxylic acid.

11 Claims, 6 Drawing Figures

(a)

(a)

(b)

LIQUID JET RECORDING HEAD HAVING A LAYER OF A RESIN COMPOSITION CURABLE WITH AN ACTIVE ENERGY RAY

BACKGROUND OF THE INVENTION

1. Field of the Invention

This invention relates to a liquid jet recording head, and more particularly to a recording head for generation of small droplets of a liquid for recording to be used in a liquid jet recording system in which recording is performed by generating small droplets of a liquid for recording such as ink, etc., and attaching them onto a recording medium such as paper.

2. Related Background Art

The liquid jet recording system which performs recording by generating small droplets of a liquid for recording such as ink, etc., and attaching them onto a recording medium such as paper is attracting attention as the recording system which generates very little noise during recording, and also is capable of high speed recording and further enables recording on a plain paper without requiring any special treatment such as fixing. Various types of this system having been actively studied.

The recording head portion of the recording device to be used in the liquid jet recording system generally consists of an orifice for discharging a liquid for recording (liquid discharging outlet), a liquid passage connected to the orifice and having a portion at which the energy for discharging the liquid for recording acts on the liquid for recording and a liquid chamber for storing the liquid for recording to be fed into the liquid passage.

The energy for discharging the liquid for recording during recording is generated in most cases by means of a discharge energy generating element of various types such as a heat generating element, piezoelectric element, etc., which is arranged at a predetermined position at the portion where the discharging energy is permitted to act on the liquid for recording which constitutes a part of the liquid passage (energy acting portion).

As methods for preparing the liquid jet recording head with such a constitution, there have been known, for example, the method comprising the steps of forming fine grooves on a flat plate of glass, metal, etc., by cutting or etching and bonding another appropriate plate onto the flat plate having such grooves formed thereon to thereby form liquid passages or the method comprising the steps of forming groove walls of a cured photosensitive resin on a substrate having a discharging energy generating element arranged thereon according to a photolithographic step to provide grooves for the liquid passages on the substrate and bonding another flat plate (covering) onto the grooved plate thus formed to thereby form liquid passages (for example, Japanese Laid-open Patent Application No. 43876/1982).

Of these methods for preparation of the liquid jet recording heads, the latter method employing a photosensitive resin is more advantageous than the former method in that liquid jet recording heads can be provided with better quality and cheaper cost because it enables fine working with better precision and better yield and easier production.

As the photosensitive resin to be used in preparation of such recording heads, there have been employed those used for pattern formation in printing plates or printed-wiring or those known as the photocurable coating materials or adhesives to be used for glass, metal, ceramics, etc. Also, in aspect of working efficiency, dry film type resins have been primarily utilized.

In the recording head employing a cured film of a photosensitive resin, in order to obtain excellent characteristics such as high recording characteristic, durability and reliability, etc., the photosensitive resin to be used for the recording head is required to have the following characteristics:

(1) particularly, excellent adhesion of the cured film to a substrate;

(2) excellent mechanical strength and durability, etc., when cured; and (3) excellent sensitivity and resolution during patterning by use of pattern exposure light.

However, under the present situation, none of the photosensitive resins used for formation of the liquid jet recording head hitherto known in the art satisfy all of the above requisite characteristics.

To describe in more detail, those employed for pattern formation in printing plates, printed-wirings, etc., as the photosensitive resin for recording head are inferior in adhesion or close contact with glass, ceramics, plastic film, etc., to be used as the substrate, although they are excellent in sensitivity and resolution, and also insufficient in mechanical strength and durability when cured. For this reason, as the stage of preparation of recording heads, or in the course during usage, there is involved the drawback that deformation of the resin cured film or peel-off from the substrate or damages are liable to occur, which may cause marked impairment of reliability of the recording head such as lowering in recording characteristics by impeding the flow of the liquid for recording in the liquid passages or making the liquid droplet discharging direction unstable.

On the other hand, those which are known as photocurable type coating materials or adhesives to be used for glass, metals, ceramics, etc., although having advantages of excellent close contact or adhesiveness with the substrate formed of these materials and also satisfactory mechanical strength and durability obtained when cured, are inferior in sensitivity and resolution and therefore require an exposure device of higher intensity or an exposure operation for a longer time. Further, their inherent characteristics cannot afford a precise and high density pattern with good resolution, whereby there is involved the problem that it is not suitable for a recording head for which minute precise working is particularly required.

SUMMARY OF THE INVENTION

The present invention has been accomplished in view of the problems as described above and an object of the present invention is to provide a liquid jet recording head having a liquid passage wall comprising a resin cured film satisfying all of the requisite characteristics as mentioned above, which is inexpensive, precise, high in reliability and excellent in durability.

Another object of the present invention is to provide a liquid jet recording head having a constitution of which the liquid passage is minutely worked with good precision and good yield.

It is also another object of the present invention to provide a liquid jet recording head which is high in reliability and excellent in durability even when formed into multi-orifices.

According to the present invention, there is provided a liquid jet recording head, having a liquid passage communicated to the discharging outlet of the liquid provided on a substrate surface, said passage being formed by subjecting a layer of a resin composition curable with an active energy ray to a predetermined pattern exposure with the use of said active energy ray to thereby form a cured region of said resin composition and removing the uncured region from said layer, said resin composition comprising:

(i) a linear polymer having a glass transition temperature of 50° C. or higher and a weight-average molecular weight of about $3.0 \times 10^4$ or more; and (ii) an epoxy resin comprising at least one compound having two or more epoxy groups in the molecule, the epoxy groups existing in said epoxy resin being partially esterified with an unsaturated carboxylic acid.

DESCRIPTION OF PREFERRED EMBODIMENTS

Figure 1:
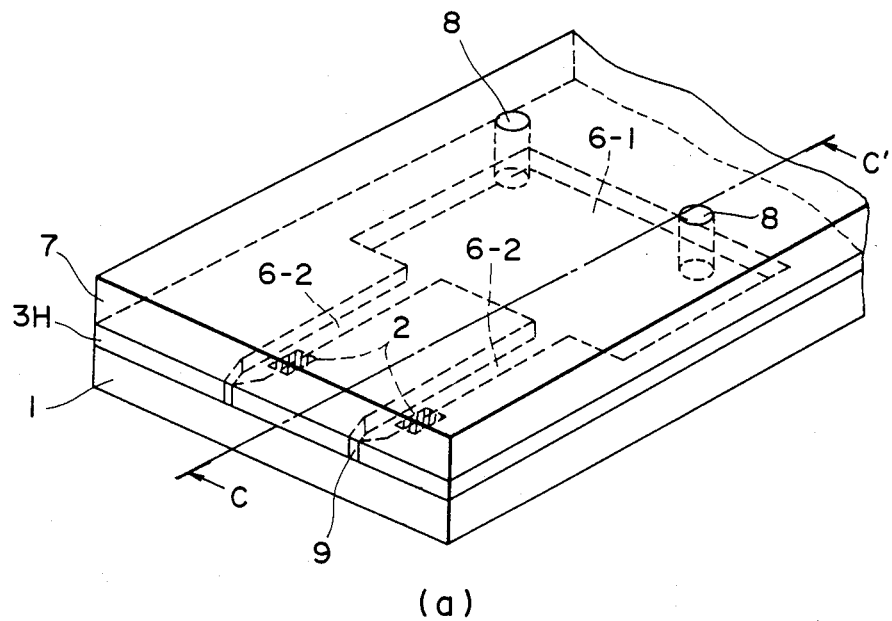
FIGS. 1 to 6 are schematic illustrations for explanation of the liquid jet recording head of the present invnetion and the method for producing the same.
Figure 1:
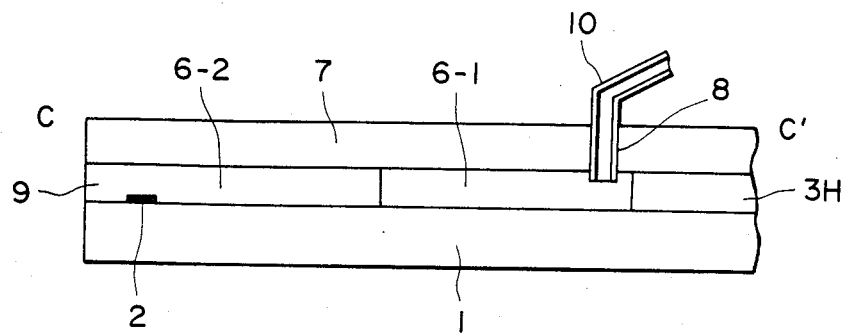

Referring now to the drawings, the liquid jet recording head of the present invention is described in detail.

FIG. 1 is an embodiment of the liquid jet recording head of the present invention, FIG. 1(a) showing a perspective view of the main portion thereof and FIG. 1(b) showing a sectional view of FIG. 1(a) cut along the line C—C'.

The liquid jet recording head comprises basically a substrate 1, a resin cured film 3H provided on the substrate 1 and subjected to patterning to a desired shape and a covering 7 laminated on the resin cured film 3H, and these members form an orifice 9 for discharging a liquid for recording, liquid passages 6-2 communicated to the orifice 9 and having the portions at which the energy for discharging the liquid for recording acts on the liquid for recording and a liquid chamber 6-1 for storing the liquid for recording to be supplied into the liquid passages 6-2. Further, at the thru-hole 8 provided on the covering 7, a feeding pipe 10 for feeding the liquid for recording from outside of the recording head into the liquid chamber 6-1 is bonded. In FIG. 1(a), the feeding pipe 10 is omitted.

During recording, the energy for discharging the liquid for recording is generated by applying discharging signals as desired on the discharge energy generating elements 2 of various types such as heat-generating elements, piezoelectric elements, etc., arranged at predetermined positions in the portions for acting the discharging energy on the liquid for recording constituting a part of the liquid passages 6-2 through wirings (not shown) connected to these elements 2.

The substrate 1 constituting the recording head of the present invention comprises glass, ceramics, plastic or metal and the generating elements 2 are arranged in a desired number at predetermined positions. In the embodiment of FIG. 1, two generating elements are provided, but the number and arrangement of the heat generating elements are determined depending on the desired constitution of the recording head.

On the other hand, the covering 7 comprises a flat plate of glass, ceramics, plastic or metal and is bonded onto the resin cured film 3H by fusion or adhesion with the use of an adhesive, and it is also provided with a thru-hole 8 for connecting a feeding pipe 10 at a predetermined position.

In the recording head of the present invention, the resin cured film 3H subjected to patterning to a predetermined shape constituting the liquid passages 6-2 and the liquid chamber 6-1 is obtained by subjecting a layer comprising a resin composition with the composition as described below on the substrate 1 or on the covering 7 to patterning according to the photolithographic step. Also, the resin cured film 3H may also be obtained by subjecting it to patterning as integrated with the covering 7 comprising a resin composition having the composition as described below.

The resin composition to be used for formation of a resin cured film provided on a substrate for constituting at least a portion which becomes the liquid passage is an active energy ray-curing resin composition comprising:

(i) a linear polymer having a glass transition temperature of 50° C. or higher and a weight-average molecular weight of about $3.0 \times 10^4$ or more; and (ii) an epoxy resin comprising at least one compound having two or more epoxy groups in the molecule, the epoxy groups existing in the epoxy resin being partially esterified with an unsaturated carboxylic acid, having good adhesion to a substrate comprising glass, plastic, ceramics, etc., particularly when formed into a cured film, being also excellent in resistance to the liquid for recording such as ink as well as mechanical strength, and further having the excellent characteristic as the constituent member of a liquid jet recording head that a precise and high resolution pattern can be formed by patterning with an active energy ray. Further, the resin composition can be used as a dry film, and also in that case, the above excellent characteristics can be exhibited.

The composition of the active energy curing type resin composition to be used for formation of the recording head of the present invention is described in detail below.

The active energy ray-curing resin composition to be used in the present invention contains as the essential component (i) a linear polymer having a glass transition temperature of 50° C. or higher and a weight-average molecular weight of about $3.0 \times 10^4$ or more to give adaptability for maintaining the composition in the form of a solid film when using the composition as, for example, a dry film and also imparting excellent mechanical strength to the pattern formed by curing.

If the glass transition temperature and the weight-average molecular weight of the linear polymer do not reach the above-mentioned limits, a satisfactory dry film cannot be obtained since the composition formed as a dry resin layer on a film substrate such as a plastic film at manufacture may gradually flow during storage to form wrinkles or to develop unevenness in layer thickness.

Examples of such linear polymers include thermoplastic copolymers principally composed of (A) a monomer of which homopolymer has relatively rigid properties to provide the above-mentioned glass transition temperature, and optionally a second monomer component of hydrophilic nature to improve the adhesion of the composition used in the present invention, within an amount not exceeding 40 mol. %, such as (B) a hydroxyl group containing acrylic monomer, (C) an amino or alkylamino group containing acrylic monomer, (D) a carboxyl group containing acrylic or vinyl monomer, (E) N-vinylpyrrolidone or a derivative thereof, (F) vinylpyridine or a derivative thereof, or (G) a monomer represented by the following formula:

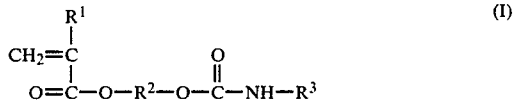

and capable of providing the composition with a strong coagulating strength thereby improving the mechanical strength of the composition, wherein $R^1$ is hydrogen or alkyl having 1 to 3 carbon atoms; $R^2$ is a bivalent hydrocarbon group which may contain therein an ether bond or may be substituted with halogen atoms; $R^3$ is alkyl having 3 to 12 carbon atoms, phenylalkyl or phenyl.

Examples of the monomer employable as the component (A) are alkyl methacrylates containing 1 to 4 carbon atoms in the alkyl radical such as methyl methacrylate, ethyl methacrylate, isobutyl methacrylate or t-butyl methacrylate; acrylonitrile and styrene. These monomers are preferably contained in an amount of 60 mol. % or higher in order to achieve the above-mentioned glass transition temperature in the linear copolymer.

In the following there are shown examples of the monomers (B)–(G) employed as the second component. Examples of the hydroxyl group-containing acrylic monomer (B) are 2-hydroxyethyl (meth)acrylate [hereinafter (meth)acrylate means both acrylate and methacrylate], 2-hydroxypropyl (meth)acrylate, 3-chloro-2-hydroxypropyl (meth)acrylate, 4-hydroxybutyl (meth)acrylate, 3-hydroxybutyl (meth)acrylate, 5-hydroxypentyl (meth)acrylate, 6-hydroxyhexyl (meth)acrylate; a monoester of 1,4-cyclohexanedimethanol and acrylic or methacrylic acid; a product known under a trade name of Aronix M5700 produced by Toa Gosei Kagaku Co., Ltd.; caprolactone acrylate known under a trade name of TONE M100 produced by Union Carbide Co.; a product known under a trade name of Light Ester HO-mpp produced by Kyoei Yushi Kagaku Co., Ltd.; 2-hydroxy-3-phenoxypropyl acrylate known under a trade name of Light Ester M-600A produced by Kyoei Yushi Kagaku Co., Ltd.; dihydric alcohols such as 1,10-decanediol, neopentylglycol, or bis(2-hydroxyethyl)-terephthalate; and monoesters of addition products of bisphenol-A and ethylene oxide or propylene oxide and (meth)acrylic acid.

Examples of the amino- or alkylamino-group containing acrylic monomer (C) are (meth)acryl amide, N,N-dimethylaminoethyl-(meth)acryl amide, N,N-dimethyl-(meth)acryl amide, N,N-dimethylaminopropyl-(meth)acryl amide, and N,N-di-t-butylaminoethyl-(meth)acryl amide.

Examples of the carboxyl group containing acrylic or vinyl monomer (D) are (meth)acrylic acid, fumalic acid, itaconic acid, and products known under a trade name of Aronix M-5400 or Aronix-M-5500 produced by Toa Gosei Kagaku Co., Ltd.

Examples of the vinyl pyridine or derivative thereof (F) are 2-vinylpyridine, 4-vinylpyridine, 2-vinyl-6-methylpyridine, 4-vinyl-1-methylpyridine, 2-vinyl-5-ethylpyridine and 4-(4-piperidinoethyl)pyridine The above-mentioned monomers (B)–(F) are all hydrophilic and provide the composition used in the present invention with a strong adhesion to a substrate such as glass, ceramics, plastics, etc.

Examples of the monomer (G) represented by the general formula (1) are ($\alpha$-alkyl)acrylic acid esters having at least one urethane bond in a molecule, obtained by reacting ($\alpha$-alkyl)acrylic acid ester, containing a hydroxyl group in a molecule, with a monoisocyanate compound. $R^2$ in the general formula (1) can be an arbitrary bivalent hydrocarbon group which may contain therein an ether bond and may be substituted with halogen atoms, but preferred examples of $R^2$ are alkylene having 2 to 12 carbon atoms and may be substituted with halogen atoms, an alicyclic hydrocarbon group such as 1,4-bismethylenecyclohexane, and a hydrocarbon group containing aromatic ring(s) such as bisphenyldimethylmethane.

Examples of the (meth)acrylic ester containing at least one hydroxyl group in the molecule, employed in the preparation of the monomer represented by the general formula (1) are 2-hydroxyethyl (meth)acrylate, 2-hydroxypropyl (meth)acrylate, 3-chloro-2-hydroxypropyl (meth)acrylate, 4-hydroxybutyl (meth)acrylate, 3-hydroxybutyl (meth)acrylate, 5-hydroxypentyl (meth)acrylate, 6-hydroxyhexyl (meth)acrylate and a product known under a trade name of Light Ester HO-mpp produced by Kyoeisha Yushi Kagaku Kogyo Co., Ltd. In addition to the foregoing, examples of ($\alpha$-alkyl)acrylic acid ester containing a hydroxyl group in a molecule include (a) esters of aliphatic or aromatic dihydric alcohols and (meth)acrylic acid, and (b) (meth)acrylic acid esters of monoepoxy compounds.

Examples of the dihydric alcohol to be employed in (a) mentioned above include 1,4-cyclohexanedimethanol, 1,10-decanediol, neopentylglycol, bis(2-hydroxyethyl)terephthalate, and addition products of 2 to 10 moles of ethylene oxide or propylene oxide to bisphenol-A. Also examples of the monoepoxy compound to be employed in (b) mentioned above include a product known under a trade name of Epolite M-1230 produced by Kyoeisha Yushi Kagaku Kogyo Co., Ltd., phenylglycidylether, cresylglycidylether, butylglycidylether, octylene oxide, and n-butylphenol glycidylether.

Also examples of the monoisocyanate compound employed in the preparation of the monomer represented by the general formula I include alkylmonoisocyanates obtained by attaching an isocyanate group to alkyl having 3 to 12 carbon atoms, phenylisocyanate and cresylmonoisocyanate.

The monomer represented by the general formula (I) is preferably contained in the linear copolymer in a content not exceeding 40 mol. %. A content exceeding 40 mol. % gives rise to a marked lowering of softening point of the composition, thus leading to a loss in the surface hardness of the pattern obtained by curing the composition or a loss in the chemical resistance by swelling.

The resin composition used for formation of the recording head of the present invention can be employed in various forms such as solution or solid film (dry film) in forming the head, but the use as a dry film is particularly advantageous because of ease of handling and of control of thickness, though the use as solution is, of course possible.

In the foregoing there has principally been explained the use of a thermoplastic linear polymer, but it is also possible, in the present invention, to employ a thermo- or photo-crosslinkable polymer.

A thermo-crosslinkable linear polymer can be obtained for example by introducing, into the above-mentioned thermoplastic linear polymer, a thermo-crosslinkable monomer represented by the following general formula II as the second component of copolymerization:

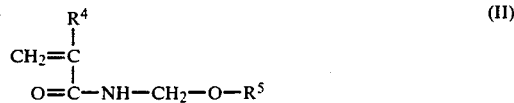

$$\begin{array}{c} R^4 \\ | \\ CH_2{=}C \\ | \\ O{=}C{-}NH{-}CH_2{-}O{-}R^5 \end{array} \quad (II)$$

wherein $R^4$ is hydrogen or alkyl or hydroxyalkyl having 1 to 3 carbon atoms, and $R^5$ is hydrogen or alkyl or acyl having 1 to 4 carbon atoms and optionally containing hydroxyl group(s). The monomer represented by the general formula II is not only thermo-crosslinkable but also hydrophilic, thus providing the resin composition for formation of the resin cured film in the present invention with excellent properties such as heat resistance, chemical resistance and mechanical strength by the thermo-crosslinking property and excellent adhesion to a substrate by the hydrophilicity.

Examples of the monomer represented by the general formula II include acrylamide derivatives such as N-methylol (meth)acrylamide [hereinafter (meth)acrylamide include acrylamide and methacrylamide], N-propoxymethyl (meth)acrylamide, N-n-butoxymethyl (meth)acrylamide, β-hydroxyethoxymethyl (meth)acrylamide, N-ethoxymethyl (meth)acrylamide, N-methoxymethyl (meth)acrylamide, N-acetoxymethyl (meth)acrylamide, α-hydroxymethyl-N-methylol acrylamide, α-hydroxyethyl-N-butoxymethyl acrylamide, α-hydroxypropyl-N-propoxy-methyl acrylamide, α-ethyl-N-methylolacrylamide, and α-propyl-N-methylol acrylamide.

The monomer represented by the above-mentioned general formula II is provided not only with hydrophilicity but also condensing crosslinkable property by heating, and liberates water or alcohol molecule at a temperature of 100° C. or higher to form crosslinking bonds, thereby causing the linear copolymer itself to form a network structure after curing and thus providing the cured pattern with excellent chemical resistance and mechanical strength.

In case of using a thermosetting linear polymer, the monomer represented by the general formula II is preferably contained therein in a range from 5 to 30 mol. %. A content within the above-mentioned range provides a sufficient chemical resistance resulting from thermal curing, but a content exceeding 30 mol. % results in a fragile pattern after curing.

Instead of the monomer represented by the above-mentioned general formula II, there may also be employed, as the component of copolymerization, a monomer capable of crosslinking by thermally opening a ring, such as glycidyl (meth)acrylate, to achieve similar effect.

A photo-crosslinkable linear polymer can be obtained by introducing a photopolymerizable monomer into a linear polymer for example by:

i  the method in which a carboxyl containing monomer exemplified by (meth)acrylic acid, etc., or an amino or tertiary amine containing monomer is copolymerized, followed by the reaction with glycidyl(meth)acrylate, etc.;

j  the method in which a partial urethane compound of polyisocyanate having one isocyanate group and one or more acrylic ester groups in one molecule is reacted with the hydroxyl group, amino group or carboxyl group in the graft chain;

k  the method in which acrylic acid chloride is reacted with the hydroxyl groups in the graft chain;

l  the method in which an acid anhydride is reacted with the hydroxyl groups in the graft chain, followed by the reaction with glycidyl(meth)acrylate;

m  the method in which the hydroxyl group in the graft chain is condensed with the condensing crosslinkable monomer as exemplified above, thereby leaving acrylamide group in the side chain;

n  the method in which the hydroxyl group in the graft chain is reacted with glycidyl(meth)acrylate; etc.

When the linear polymer is heat crosslinkable, it is preferable to perform heating after formation of a pattern by irradiation of an active energy ray. On the other hand, also when the above linear polymer is photopolymerizable, there is no problem in performing heating within the range permissible in aspect of heat resistance of the substrate, and rather preferable results can be given by heating.

The linear polymers employed in the resin composition for formation of the resin cured film in the present invention can be roughly classified, as explained above, into those without curing property, those with photo-crosslinking property and those with thermo-crosslinking property, but any of them is capable, in the curing process of the composition (i.e. pattern formation by the irradiation of an active energy ray optionally followed by thermal curing) of precise patterning by imparting form maintaining property to the composition, and also gives excellent adhesiveness, chemical resistance as well as high mechanical strength to the pattern obtained by curing.

The resin component (ii) obtained by esterifying a part of the epoxy groups existing in the epoxy resin comprising one or more compound having two or more epoxy groups in one molecule with an unsaturated carboxylic acid to be used as another component in the resin composition for formation of the resin cured film in the present invention (hereinafter abbreviated as half-esterified epoxy resin) is a component which permits the composition to exhibit curability with an active energy ray and, in addition thereto, imparts better adhesiveness with a substrate, water resistance, chemical resistance, dimensional stability, etc., to the cured film formed by coating the resin composition in liquid state on various substrates comprising glass, plastics, ceramics, etc., followed by curing, or to the cured film formed by adhering the resin composition in the form of a dry film on various substrates.

The half-esterified epoxy resin (ii) to be contained in the resin composition for formation of the resin cured film used in the present invention can be obtained by, for example, reacting an epoxy resin with a predetermined amount of an unsaturated carboxylic acid in the co-presence of an addition catalyst and a polymerization inhibitor, in the presence or absence of a solvent, under the temperature condition of 80° to 120° C., thereby esterifying a part of the epoxy groups existing in the epoxy resin with the carboxylic acid.

Examples of the epoxy resin comprising one or more compounds containing 2 or more epoxy groups in one molecule which can be used for formation of the half-esterified epoxy resin (iii) include epoxy resins as represented by the bisphenol A type, novolac type, alicyclic type, or polyfunctional epoxy resins such as bisphenol S, bisphenol F, tetrahydroxyphenylmethane tetraglycidyl ether, resorcinol diglycidyl ether, glycerine triglycidyl ether, pentaerythritol triglycidyl ether, isocyanuric acid triglycidyl ether and epoxy-urethane resins represented by the following formula III:

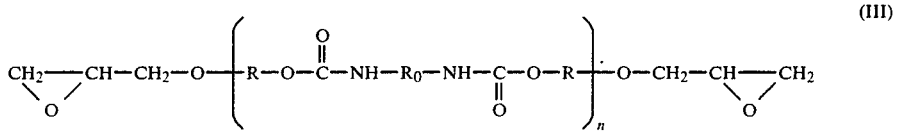

(wherein R represents an alkylene group or an oxyalkylene group, $R_0$ represents

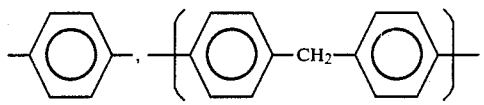

or an alkylene group), and mixtures of at least one of these.

Specific examples of these polyfunctional epoxy resins include those as mentioned below. That is, the bisphenol A type epoxy resin may be, for example, Epicoat 828, 834, 871, 1001, 1004 (trade names, produced by Shell Chemical Co.), DER 331-J, 337-J, 661-J, 664-J, 667-J (produced by Dow Chemical Co.) and Epicrone 800 (trade name, produced by Dainippon Ink Kagaku Kogyo K.K.), etc. The novolac type epoxy resin may be, for example, Epicoat 152, 154, 172 (trade names, produced by Shell Chemical Co.), Allaldite EPN 1138 (trade name, produced by Ciba Geigy Co.), DER 431, 438 and 439 (trade names, produced by Dow Chemical Co.), etc. The alicyclic epoxy resin may be, for example, Araldite CY-175, -176, -179, -182, -184, -192 (trade names, produced by Ciba Geigy Co.), Chissonox 090, 091, 092, 301, 313 (trade names, produced by Chisso K.K.), CYRACURE 6100, 6110, 6200 and ERL 4090, 4617, 2256, 5411 (trade names, produced by Union Carbide Co.), etc. The polyglycidyl ether of aliphatic polyhydric alcohol may be, for example, ethyleneglycol diglycidyl ether, polyethyleneglycol diglycidyl ether, propyleneglycol diglycidyl ether, polypropyleneglycol diglycidyl ether, neopentylglycol diglycidyl ether, 1,6-hexanediol diglycidyl ether, glycerine diglycidyl ether, trimethylolpropane triglycidyl ether, diglycidyl ether of hydrogenerated bisphenol A, 2,2-dibromoneopentylglycol diglycidyl ether, etc.; the polyglycidyl ether derived from aromatic polyhydric alcohol may be, for example, diglycidyl ether of an addition product of bisphenol A added with 2 to 16 mols of alkyleneoxide, a diglycidyl ether of an addition product of bisphenol F added with 2 to 16 mols of alkyleneoxide, a diglycidyl ether of an addition product of bisphenol S added with 2 to 16 mols of alkyleneoxide.

While various unsaturated carboxylic acids can be used for half-esterification of the epoxy resin, it is preferable for imparting better curability with an activation energy to the resin composition for formation of the resin cured film used in the present invention to use a monobasic unsaturated carboxylic acid having an acrylic or methacrylic vinyl group on at least one terminal end of the molecule and a carboxyl group on the other terminal end.

Typical examples of such unsaturated carboxylic acid may include acrylic acid and methacrylic acid, and it is also possible to use a monoester compound obtained by the reaction between a dicarboxylic acid and a (meth)acrylic acid ester having one hydroxyl group.

The above dicarboxylic acid may include phthalic acid, isophthalic acid, terephthalic acid, oxalic acid, malonic acid, succinic acid, glutaric acid, adipic acid, pimelic acid, suberic acid, azelaic acid, sebacic acid, isosebacic acid, tetrahydrophthalic acid and anhydrydes thereof.

The above (meth)acrylic acid ester having one hydroxyl group may include, 2-hydroxypropyl (meth)acrylate, 3-chloro-2-hydroxypropyl (meth)acrylate, 4-hydroxybutyl (meth)acrylate, 3-hydroxybutyl (meth)acrylate, 5-hydroxypentyl (meth)acrylate and 6-hydroxyhexyl (meth)acrylate and the like.

Examples of the addition reaction catalyst which can be used for half-esterification reaction of epoxy resin include metal halides such as zinc chloride, lithium chloride or the like; sulfide compounds such as dimethyl sulfide, methylphenyl sulfide or the like; sulfoxide compounds such as dimethyl sulfoxide, methylethylsulfoxide or the like; tertiary amine compounds such as N,N-dimethylaniline, pyridine, triethylamine, benzyldimethylamine or the like, and their hydrochlorides or hydrobromides; quaternary ammonium salts such as tetramethylammonium chloride, trimethyldodecylbenzylammonium chloride, triethylbenzylammonium chloride or the like; sulfonic acid compounds such as p-toluene sulfonic acid; and mercaptan compounds such as ethylmercaptan, propylmercaptan or the like.

Further, examples of the polymerization inhibitor which can be used for half-esterification include hydroquinone, alkyl or aryl-substituted hydroquinone, tertiary butylcatechol, pyrogallol, naphthylamine, β-naphthol, cuprous chloride, 2,6-di-tert-butyl-p-cresol, phenothiazine, pyridine, N-nitrosodiphenylamine and nitrobenzene.

The solvent which can be used when carrying out half-esterification in the presence of a solvent may include toluene, xylene, methyl isobutyl ketone, methyl ethyl ketone, ethyl acetate, butyl acetate and isobutyl acetate, etc.

The amounts of the epoxy resin and the unsaturated carboxylic acid used during half-esterification may be suitably selected so that the ratio of the epoxy groups in the epoxy resin to the carboxyl groups in the unsaturated carboxylic acid may preferably 1:0.3 to 1:0.7, more preferably 1:0.45 to 1:0.55.

If the rate of esterification of epoxy groups by unsaturated carboxylic acid in the half-esterified epoxy resin is higher than the above-mentioned range, the satisfactory chemical resistance and dimensional stability resulting from the epoxy resin cannot be effectively exploited in the resin composition used in the present invention. On the other hand, if the rate of esterification is lower than the above range, the high resolving power and curing property in response to an active energy ray, resulting from (meth)acrylate ester groups cannot be effectively exhibited in the resin composition of the present invention.

As explained in the foregoing, the active energy ray curable resin composition used in the present invention is provided with a curing property in response to an active energy ray resulting from the (meth)acrylate ester groups in the half-esterified epoxy resin which is contained as an essential component, and a thermo-curing property resulting from epoxy groups. Therefore, a cured film obtained, after curing the resin composition by the irradiation of an active energy ray, by thermal curing for. 10 minutes to 3 hours at a temperature at least equal to 80° C. is effectively given satisfactory chemical resistance and dimensional stability, resulting from the epoxy resin.

The resin composition for formation of the resin cured film used in the present invention may further contain a monomer (iii) having ethylenic unsaturated bond(s). The monomer (iii) containing ethylenic unsaturation, optionally employable in the present invention is employed, in cooperation with the aforementioned resin component (ii), to provide the resin composition with a curing property in response to an active energy ray, and in particular with an excellent sensitivity to the active energy ray. For this purpose there can be employed various monomers curable by the irradiation of an active energy ray, the monomer being preferably provided with a boiling point at least equal to 100° C. under atmospheric pressure and preferably provided with at least two ethylenic unsaturated bonds.

Specific examples of such monomers having two or more ethylenically unsaturated bonds include a acrylic acid esters or methacrylic acid esters of polyfunctional epoxy resins having two or more epoxy groups in one molecule, b acrylic acid esters or methacrylic acid esters of alkyleneoxide addition products of polyhydric alcohols, c polyester acrylates having acrylic acid ester group at the terminal ends of the molecular chains of polyesters having molecular weights of 500 to 3000 comprising dibasic acid and dihydric alcohol, d the reaction products between polyisocyanates and acrylic acid monomers having hydroxyl groups. The above monomers a - d may be urethanemodified products having urethane bonds in the molecules.

Examples of the monomers belonging to a include acrylic acid or methacrylic acid esters of polyfunctional epoxy resins to be used for formation of the resin component (half-esterified epoxy resin) for the resin component (ii) which becomes one of the components in the resin composition used in the present invention as described above.

Examples of the monomers belonging to b include ethyleneglycol di(meth)acrylate, diethyleneglycol (meth)acrylate, polyethyleneglycol di(meth)acrylate, 1,6-hexanediol (meth)acrylate, polyethyleneglycol di(meth)acrylate, pentaerythritol tri(meth)acrylate and the like, and those known under the trade names of KAYARAD HX-220, HX-620, D-310, D-320, D-330, DPHA, R-604, DPCA-20, DPCA-30, DPCA-60, DPCA-120 (all produced by Nippon Kayaku K.K.), and also those known under the trade names of NK ester BPE-200, BPE-500, BPE-1300, A-BPE-4 (all produced by Shin Nakamura Kagaku K.K.), etc., may also be available.

The monomers belonging to c may be exemplified by those known under the trade names of Aronix M-6100, M-6200, M-6250, M-6300, M-6400, M-7100, M-8030, M-8060, M-8100 (all produced by Toa Gosei Kagaku K.K.). Examples of the monomers belonging to b and having urethane bonds of polyester include those known under the trade names of Aronix M-1100, Aronix M-1200, (both produced by Toa Gosei Kagaku K.K.).

The monomers belonging to may d include the reaction products between polyisocyanate such as tolylene diisocyanate, isophorone diisocyanate, hexamethylene diisocyanate, trimethylhexamethylene diisocyanate, lysine diisocyanate, diphenylmethane diisocyanate or the like with a hydroxyl containing acrylic monomer, and it is possible to use the reaction products having (meth)acrylic acid esters containing hydroxyl group(s) added to polyisocyanate compounds known under the trade names of Sumidule N (buret derivative of hexamethylene diisocyanate), Sumidule L (trimethylolpropane modified product of tolylene diisocyanate) (all produced by Sumitomo Bayer Urethane K.K.), etc. The hydroxyl containing acrylic monomer as herein mentioned may include typically (meth)acrylic acid esters, preferably hydroxyethyl acrylate, hydroxyethyl methacrylate, hydroxypropyl acrylate. It is also possible to use other acrylic monomers containing hydroxyl group(s) mentioned in the present specification as monomer for the preparation of the linear polymer.

In addition to the monomers having two or more ethylenically unsaturated bonds as mentioned above, it is also possible to use monomers having only one ethylenically unsaturated bond as mentioned below together with these monomers. To exemplify such monomers having one ethylenically unsaturated bond, there may be included, for example, carboxyl containing unsaturated monomers such as acrylic acid, methacrylic acid or the like; glycidyl containing unsaturated monomers such as glycidyl acrylate, glycidyl methacrylate or the like; $C_2$–$C_8$ hydroxyalkyl esters of acrylic acid or methacrylic acid such as hydroxyethyl acrylate, hydroxyethyl methacrylate, hydroxypropyl acrylate, hydroxypropyl methacrylate or the like; monoesters of acrylic acid or methacrylic acid with polyethyleneglycol or polypropyleneglycol such as polyethyleneglycol monoacrylate, polyethyleneglycol monomethacrylate, polypropyleneglycol monoacrylate, polypropyleneglycol monomethacrylate or the like; $C_1$–$C_{12}$ alkyl or cycloalkyl esters of acrylic acid or methacrylic acid such as methyl acrylate, ethyl acrylate, propyl acrylate, isopropyl acrylate, butyl acrylate, hexyl acrylate, octyl acrylate, lauryl acrylate, cyclohexyl acrylate, methyl methacrylate, ethyl methacrylate, propyl methacrylate, isopropyl methacrylate, butyl methacrylate, hexyl methacrylate, octyl methacrylate, lauryl methacrylate, cyclohexyl methacrylate or the like; other monomers such as styrene, vinyltoluene, methylstyrene, vinyl acetate, vinyl chloride, vinyl isobutyl ether, acrylonitrile, acrylamide, methacrylamide, acrylic acid or methacrylic acid adduct of alkylglycidyl ether, vinylpyrrolidone, dicyclopentenyloxyethyl(meth)acrylate, ε-caploractone-modified hydroxyalkyl(meth)acrylate, tetrahydrofurfulyl acrylate, phenoxyethyl acrylate; and others.

Anyway, by further adding the above monomer having ethylenically unsaturated bonds (iii), high sensitivity and satisfactory curability to an active energy ray can be further imparted to the composition used in the present invention.

The active energy ray-curable resin composition for formation of the resin cured film used in the present invention can be cured by the active energy ray, and it is preferable to add thereto a radical polymerization initiator capable of forming organic free radicals which can be activated by the action of an active energy ray in the resin composition when employing an active energy ray with wavelength of 250 nm to 450 nm. As the radical polymerization initiator, known substances having the property of being activated with an active energy ray, forming organic free radicals and initiating radical polymerization can be used without any particular limitation.

Specific examples of such radical polymerization initiators include benzyl, benzoin alkyl ethers such as benzoin isobutyl ether, benzoin isopropyl ether, benzoin-n-butyl ether, benzoin ethyl ether, benzoin methyl ether and the like; benzophenones such as benzophenone, 4,4'-bis(N,N-diethylamino)benzophenone, benzophenone methyl ether and the like; anthraquinones such as 2-ethylanthraquinone, 2-t-butylanthraquinone and the like; xanthones such as 2,4-dimethylthioxanthone, 2,4-diisopropylthioxanthone and the like; acetophenones such as 2,2-dimethoxy-2-phenylacetophenone, α,α-dichloro-4-phenoxyacetophenone, p-tert-butyltrichloroacetophenone, p-tert-butyl-dichloroacetophenone, 2,2-diethoxyacetophenone, p-dimethylaminoacetophenone and the like; or hydroxycyclohexylphenyl ketone (e.g., Irugacure 184, produced by Ciba Geigy Co.), 1-(4-isopropylphenyl)-2-hydroxy-2-methylpropane-1-one (e.g. Darocure 1116, produced by MERCK Co.), 2-hydroxy-2-methyl-1-phenylpropane-1-one (Darocure 1173, produced by MERCK CO.); etc., as preferable ones. In addition to these radical polymerization initiators, amino compounds may be added as the photopolymerization accelerator.

The amino compounds to be used as the photopolymerization accelerator may include ethanolamine, ethyl-4-dimethylaminobenzoate, 2-(dimethylamino)ethylbenzoate, p-dimethylaminobenzoic acid n-amylester, p-dimethylaminobenzoic acid isoamylester, etc.

Further, in the active energy ray-curable resin composition used in the present invention, in order that the epoxy groups possessed by the half-esterified epoxy resin (ii) can be also photopolymerized by the action of the active energy ray, there can be formulated aromatic onium salt compounds having photosensitivity containing an element belonging to the group VIa shown in Japanese Patent Publication No. 14278/1977 or aromatic onium salt compounds having photosensitivity containing an element belonging to the group Va shown in Japanese Patent Publication No. 14279/1977.

The aromatic onium salt compounds having photosensitivity of the element belonging to the group VIa or the group Va may include typically the compounds of the following formula IV:

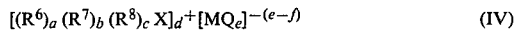

(wherein, $R^6$ is a monovalent organic aromatic group, $R^7$ is a monovalent organic aliphatic group selected from alkyl groups, dicycloalkyl groups and substituted alkyl groups, $R^8$ is a polyvalent organic group for constituting heterocyclic or fused ring structure selected from aliphatic groups and aromatic groups, X is an element belonging to the group VIa selected from sulfur, selenium and tellurium or an element belonging to the group Va selected from nitrogen, phosphorus, arsenic, antimony and bismuth, M is a metal or metalloid and Q is a halogen atom, a is an integer of 0 to 3 when X is an element belonging to the group VIa or an integer of 0 to 4 when X is an element belonging to the group Va, b is an integer of 0 to 2, c is an integer of 0 or 1 when X is an element belonging to the group VIa or an integer of 0 to 2 when X is an element belonging to the group Va, f is an integer of 2 to 7 representing the valence of M, e is an integer which is greater than f but not more than 8, and the sum of a, b and c is 3 (valence of X) when X is an element belonging to the group VIa or 4 (valence of X) when X is an element belonging to the group Va, and d=e−f).

These compounds have the characteristic that the onium salt will release a Lewis acid by irradiation of light on these compounds, which acid cures the epoxy resin.

Specific examples of the photosensitive aromatic onium salt compounds containing an element belonging to the group VIa or the group Va which can be formulated in the resin composition of the present invention may include the photosensitive aromatic onium salts of the elements belonging to the group VIa as shown below:

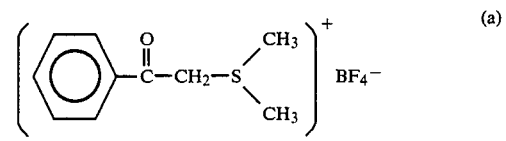

(a)

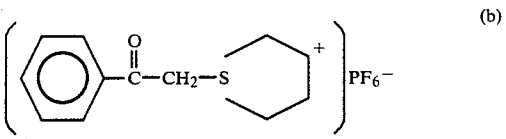

(b)

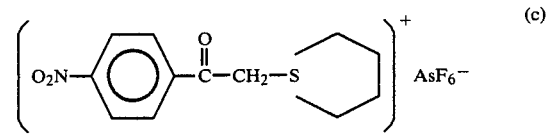

(c)

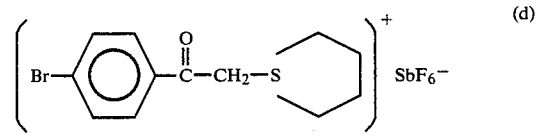

(d)

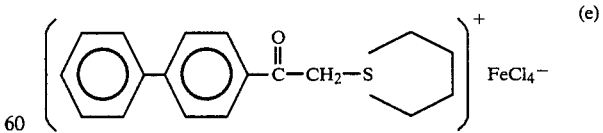

(e)

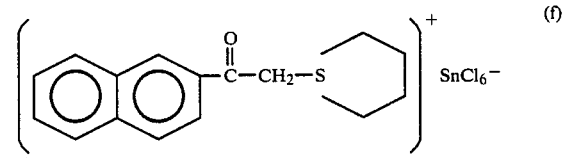

(f)

-continued
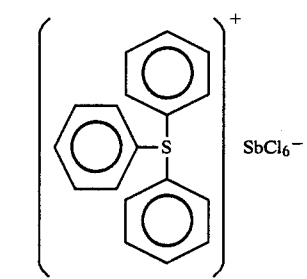 (g)
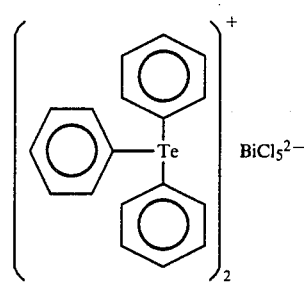 (h)
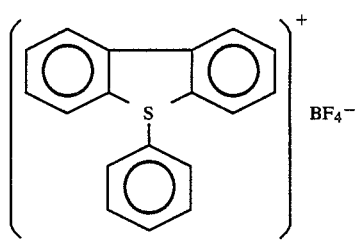 (i)
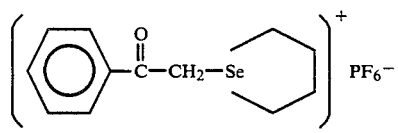 (j)
and photosensitive aromatic onium salts of the elements belonging to the group VIa as shown below:
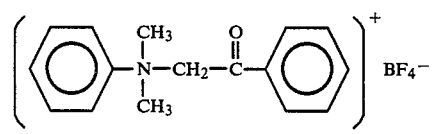 (1)
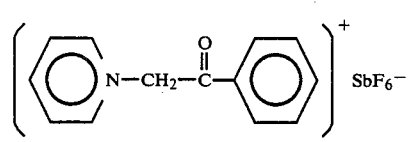 (2)
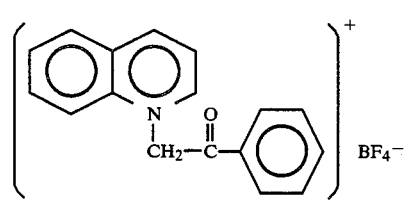 (3)
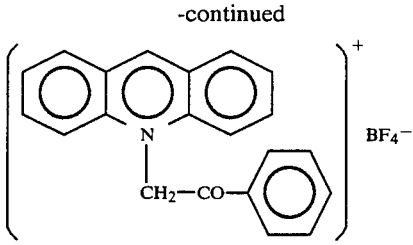 (4)
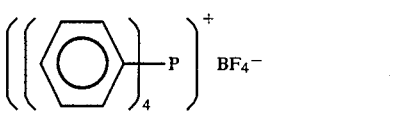 (5)
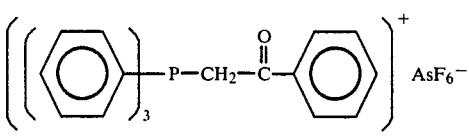 (6)
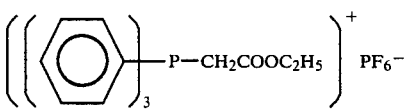 (7)
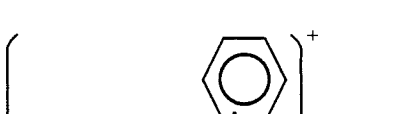 (8)
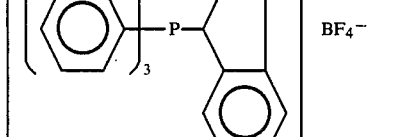 (9)
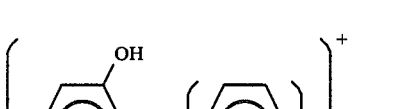 (10)
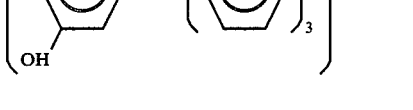 (11)
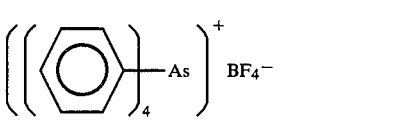
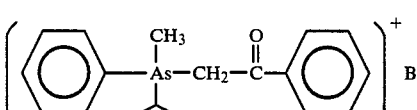 (12)
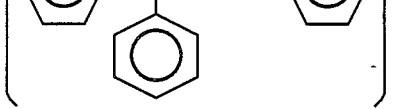

As regards the ratio of the aforementioned material constituting the active energy ray curable resin composition used in the present invention, the linear polymer (i) occupies 20 to 80 parts by weight, preferably 20 to 50 parts by weight, while the half-esterified epoxy resin (ii), optionally combined with the monomer (iii) having ethylenic unsaturated bond, occupies 80 to 20 parts by weight, preferably 80 to 50 parts by weight, so that the components (i) +(ii) or (i)+(ii)+(iii) represent 100 parts by weight. In the presence of the monomer (iii) having ethylenic unsaturated bond, the amounts of the monomer (iii) and the half-esterified epoxy resin (ii) are preferably selected in such a manner that the ratio thereof in the resin composition is in a range from 30:70 to 70:30, in order to fully exploit the characteristics of these components.

More specifically the half-esterified epoxy resin (ii) is effective for rendering the physical properties such as adhesion to the substrate, chemical resistance and dimensional stability of the cured film close to those of the cured film of epoxy resin, while the monomer (iii) having ethylenic unsaturated bond is effective for providing the resin composition with a high sensitivity to the activating energy, and it is possible to obtain an excellent resin composition and an excellent cured film based on the composition, provided with the properties of both components, if the ratio of the components (ii) and (iii) is in the above-mentioned range.

In case a radical polymerization initiator to be activated by an active energy ray is included in the resin composition used in the present invention, the polymerization initiator is added in an amount of 0.1 to 20 parts by weight, preferably 1 to 10 parts by weight, to 100 parts by weight of the resin components, consisting of the linear polymer, half-esterified epoxy resin and optionally monomer containing ethylenic unsaturated bond [(i)+(ii) or (i)+(ii)+(iii)].

Also in case of use of the photosensitive aromatic onium salts containing an element of the group VIa or Va of the periodic table, said compound is included in an amount of 0.2 to 15 parts by weight, preferably 0.5 to 10 parts by weight, with respect to 100 parts by weight of the resin components consisting of the linear polymer, half-esterified epoxy resin and optionally monomer containing ethylenic unsaturated bond [(i)+(ii) or (i)+-(ii)+(iii)].

As the solvent to be used when employing the active energy ray-curing resin composition for formation of the resin cured film used in the present invention in the form of a solution or when coating the composition on a plastic film which is a film substrate in formation of a dry film, hydrophilic solvents such as alcohols, glycol ethers, glyco esters, etc., may be employed. Of course, it is also possible to use mixtures comprising these hydrophilic solvents as the main component, mixed optionally at appropriate proportions with ketones such as methyl ethyl ketone, methyl isobutyl ketone, etc., esters such as ethyl acetate, isobutyl acetate, etc., aromatic hydrocarbons such as toluene, xylene, etc., and their halogen derivatives, aliphatic solvents containing chlorine such as methylene chloride, 1,1,1-trichloroethane, etc. These solvents can be also used as the developer for the composition of the present invention.

The active energy ray-curing resin composition used in the present invention may further contain in addition to the above radical polymerization initiator or the solvent as described above, additives such as catalysts for condensation crosslinking, heat polymerization inhibitors, colorants (dyes and pigments), fine particulate fillers, adhesion promotors, plasticizers, etc., if desired.

The condensation crosslinking catalyst may include sulfonic acids, typically p-toluenesulfonic acid, carboxylic acids such as formic acid, etc. The heat polymerization inhibitor may include hydroquinone and derivatives thereof, p-methoxyphenol, phenothiazine, etc. As the colorant there can be added oil-soluble dyes and pigments within the range which do not substantially pravent transmission of the active energy ray. As the filler, for enhancement of hardness of coating, as well as for enhancement of coloration, adhesion, mechanical strength, there may be employed extender pigments, plastic fine particles, etc., which are used in coating materials in general. As the adhesion promotor, silane coupling agents, low molecular surfactants as inorganic surface modifiers may be effectively used in the composition of the present invention.

The resin composition comprising the composition as described above is cured with an active energy ray to form the resin cured film 3H possessed by the recording head of the present invention. Next, as an embodiment of the case when employing a dry film type as the resin composition for formation of the resin cured film 3H, the method for preparing the liquid jet recording head of the present invention is described in detail by referring to the drawings.

FIGS. 2 to 6 are schematic illustrations for description of the preparation procedure of the liquid jet recording head of the present invention.

Figure 2:
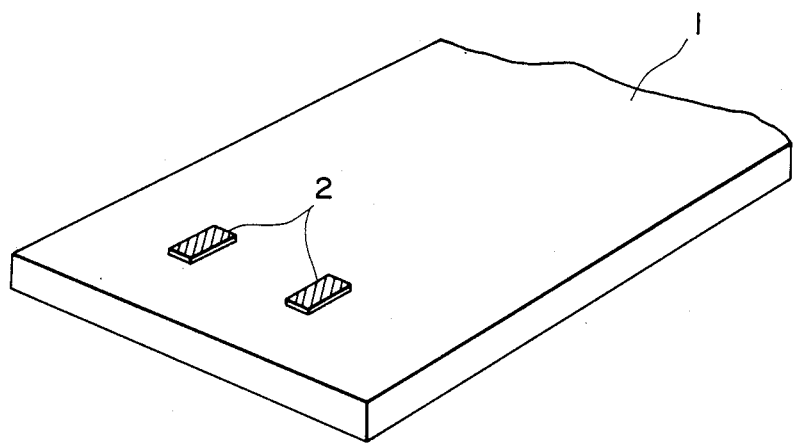
Figure 3:
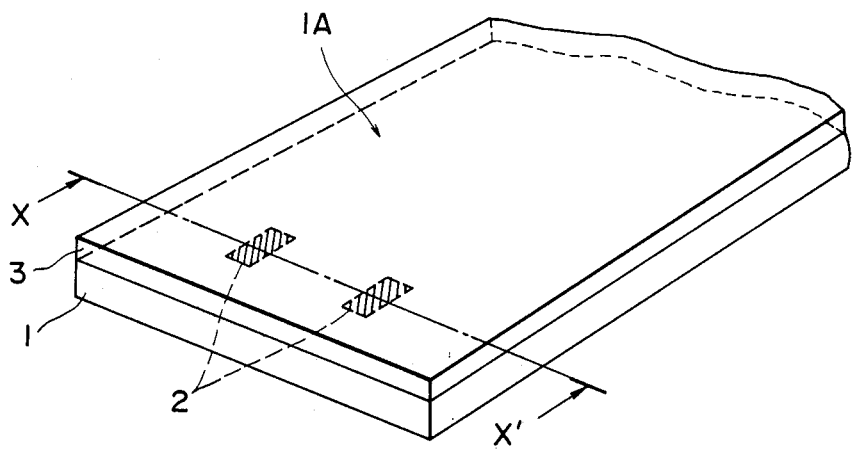
Figure 3:
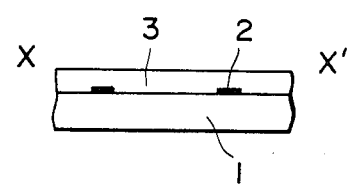

For formation of the liquid jet recording head of the present invention, first, as shown in FIG. 2, a discharge energy generating element 2 such as heat generating element or piezoelectric element is arranged in a desired number on a substrate 1 such as glass, ceramic, plastic or a metal. If desired, for the purpose of imparting resistance to the liquid for recording or electrical insulating property, etc., to the surface of the substrate 1, the surface may be coated with a protective layer of $SiO_2$, $Ta_2O_5$, glass, etc. Also, to the discharge energy generating element 2 is connected electrodes for inputting recording signals, although not shown in the drawing.

Next, the surface of the substrate 1 obtained after the step shown in FIG. 1 is cleaned and at the same time dried at, for example, 80° to 150° C., and then the active energy ray-curing resin composition 3 as described above of the dry film type (film thickness, about 25 μm to 100 μm), as shown in FIG. 3(a) and FIG. 3(b) is heated to about 40° to 150° C. and laminated on the substrate surface 1A at a speed of, for example, 0.5 to 0.4 f/min. under the pressurizing condition of 1 to 3 Kg/cm².

Figure 4:
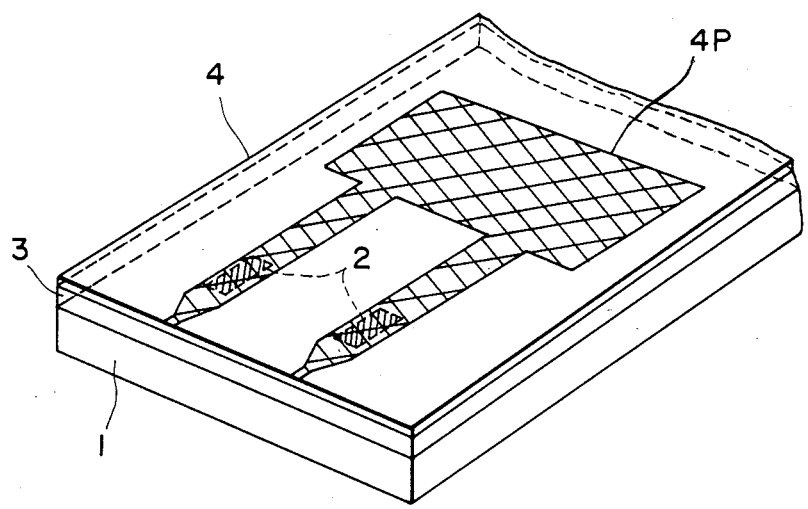
Figure 5:
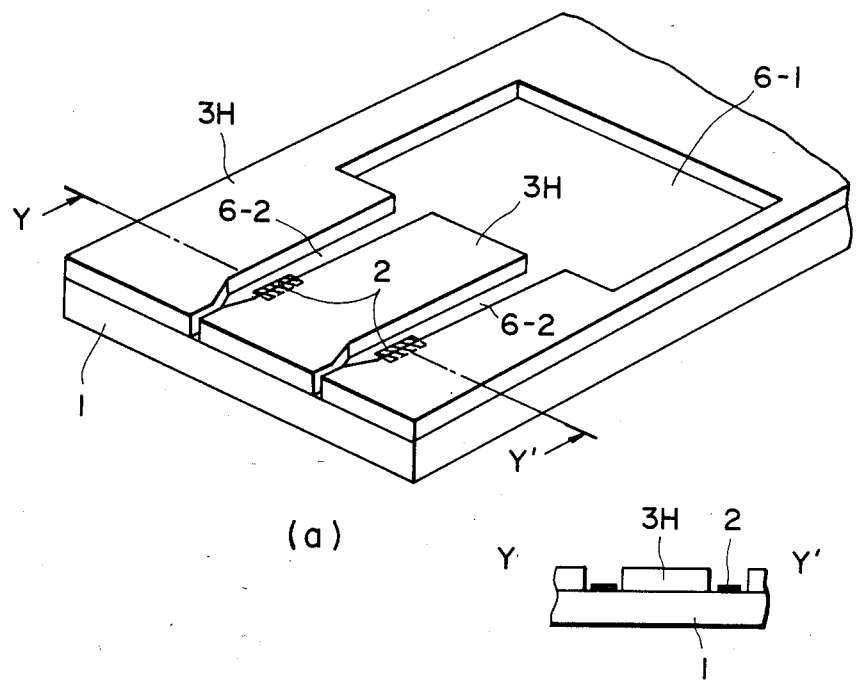

Subsequently, as shown in FIG. 4, on the dry film layer 3 provided on the substrate surface 1A, a photomask 4 having a pattern 4P with a desired shape which does not transmit the active energy ray is superposed, and then exposure is effected from above the photomask 4.

Registration between the photomask 4 and the substrate 1 is effected so that the above element 2 may be positioned in the liquid passage region finally formed after the steps of exposure and developing processing, etc., for example, according to the method in which registration marks are previously drawn respectively on the substrate 1 and the mask 4 and registration is effected following the marks.

By carrying out such an exposure, the portion other than that covered with the pattern, namely the portion exposed of the dry film layer 3 is cured by polymerization, to become insoluble in a solvent, while the unexposed portion remains soluble in a solvent.

The active energy ray to be used for such a pattern exposure may include ultraviolet rays (UV-rays) or electron beams which have widely been practically applied. As the UV-ray light source, there may be employed high pressure mercury lamps, ultra-high pressure mercury lamps, metal halide lamps, etc., enriched in light with wavelength of 250 nm to 450 nm, preferably those which can give a light intensity of about 1 mW/cm$^2$ to 100 mW/cm$^2$ at the wavelength in the vicinity of 365 nm at a distance between the lamp and the material to be irradiated which is practically permissible. The electron beam irradiation device is not particularly limited, but a device having a dose within the range of 0.5 to 20 M Rad is practically suitable.

After completion of the pattern exposure of the dry film layer 3, the dry film 3 subjected to exposure is developed by, for example, dipping in a volatile organic solvent such as 1,1,1-trichloroethane, etc., to remove by dissolution the unpolymerized (uncured) portion of the dry film layer 3 which is solvent soluble, thereby forming the grooves which will finally become the liquid passages 6-2 and liquid chamber 6-1 with the resin cured film 3H remaining on the substrate 1 as shown in FIG. 5(a) and FIG. 5(b).

As the next step, in such a case where a heat curable linear polymer is used in the active energy ray-curing resin composition, the cured resin film 3H on the substrate I is subjected to heat polymerization by heating, for example, at a temperature of 100° C. for about 5–10 minutes.

In the recording head of this embodiment, the grooves for liquid passages 6-2 and liquid chamber 6-1 are formed by referring to an example using a resin composition of the dry film type, namely a solid composition. However, the active energy ray-curing resin composition which can be used in formation of the recording head of the present invention is not limited to only solid compositions, but also a liquid composition may be available.

As the method for forming a layer comprising the composition by use of a liquid resin composition on the substrate, there may be employed, for example, the method according to squeegee as used in preparation of a relief image, namely the method in which a wall with a height corresponding to the desired thickness of the resin composition layer to be formed is provided around the substrate and superfluous resin composition is removed by means of a squeegee, etc. In this case, the resin composition may appropriately have a viscosity of 100 cp to 3000 cp. The height of the wall placed around the substrate is also required to be determined in view of the amount reduced by evaporation of the solvent contained in the light-sensitive resin composition.

When a solid resin composition is employed, it is suitable to use the method in which a dry film is plastered on the substrate by pressure contact under heating.

However, in forming the recording head of the present invention, a solid film type is convenient in handling and also with respect to easy and correct control of the thickness.

After having thus formed the grooves for constituting finally the liquid passages 6-2 and the liquid chamber 6-1 with the resin cured film 3H, a flat plate 7 which is a covering over the grooves is bonded with an adhesive on the resin cured film 3H to form a bonded body, as shown in FIG. 6(a) and FIG. 6(b).

In the steps shown in FIG. 6(a) and FIG. 6(b), as the specific method for providing the covering 7, for example, after the flat plate 7 of glass, ceramic, metal, plastic, etc., is applied with an epoxy resin type adhesive by spin coating to a thickness of 3 to 4 μm, the adhesive layer is previously heated to effect the so called B-staging and then plastered on the cured dry film 3H, followed by main curing of the above adhesive layer. However, it is also possible to use no adhesive such as by having a flat plate 7 of a thermoplastic resin such as acrylic resin, ABS resin, polyethylene, etc., thermally fused directly onto the resin cured film 3H.

It is also preferable to use the method in which a resin layer comprising the resin composition for formation of the resin cured film in the present invention is provided on the covering 7 on the side to be bonded to the liquid passages, the resin layer is thermally fused to the resin cured film 3H having formed liquid passages thereon and thereafter heated with irradiation of an active energy ray, namely the method of using the resin composition for formation of the resin cured film in the present invention as the adhesive.

Figure 6:
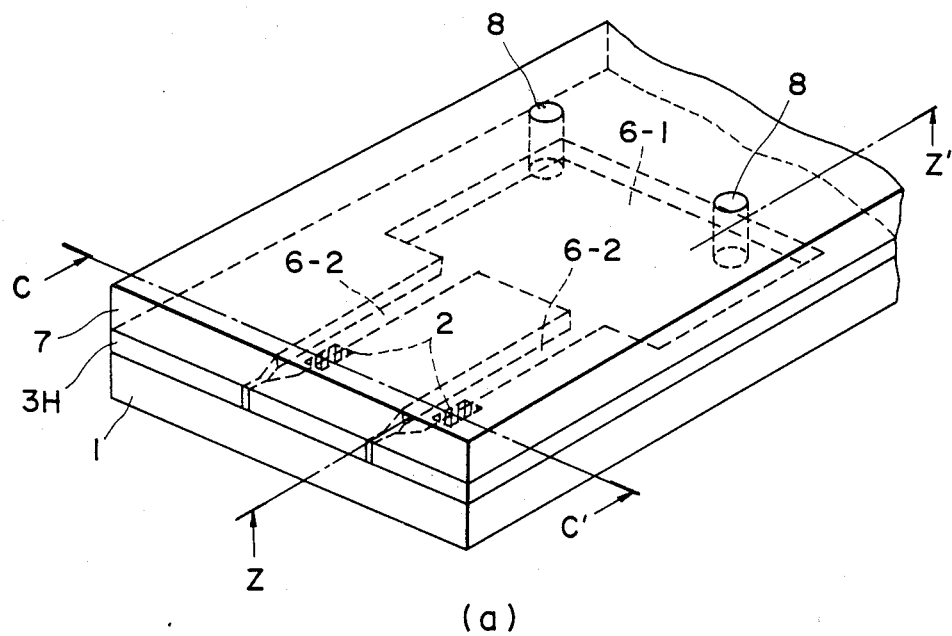
Figure 6:
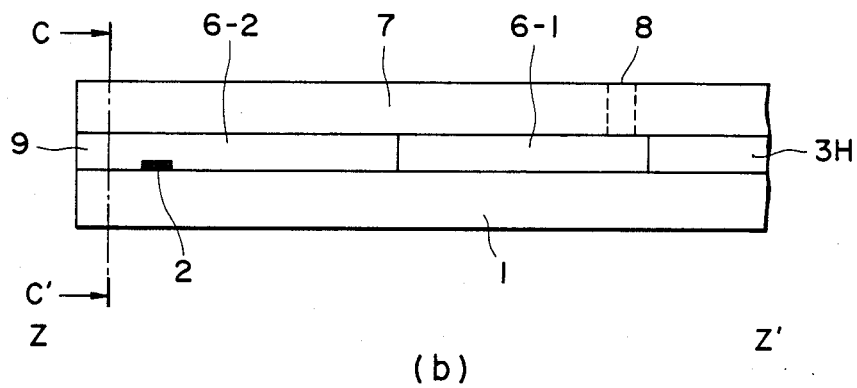

In FIG. 6, 6-1 shows a liquid chamber, 6-2 liquid passages and 8 the thru-holes for connecting feeding pipes (not shown) for feeding the liquid for recording to the liquid chamber 6-1 from outside of the recording head not shown.

After having completed thus the bonding between the resin cured film 3H provided on the substrate 1 and the flat plate 7, the bonded body is cut along C-C' positioned on the downstream side of the liquid passage 6-2 shown in FIG. 6(a) and FIG. 6(b), thereby forming an orifice for discharging the liquid for recording which is the opening portion of the liquid passage at the cut surface.

This step is conducted for making the interval between the discharge energy generating element 2 and the orifice 9 adequate, and the region to be cut may be selected suitably. For this cutting, there may be employed the dicing method, etc., which is conventionally employed in semiconductor industries.

The downstream portion of the liquid passage as mentioned in the present invention refers to the region on the downstream side in the flow direction of the liquid for recording when recording is performed by use of a recording head, more specifically the portion of the liquid passage downstream of the position where the discharge energy generating element 2 is located.

After completion of cutting, the cut surface is smoothed by polishing and a feeding pipe 10 is mounted on the thru-hole 8 to complete a liquid jet recording head as shown in FIG. 1.

In the recording head as described above, the liquid passages 6-2 and the liquid chamber 6-1 are formed integrally with a resin cured film 3H, but the recording head of the present invention is not limited to such a structure, and it is also possible to use a structure in which liquid passages are formed separately from the liquid chamber. However, even if any structure may be taken, the recording head of the present invention is such that at least a part of the resin for forming the liquid passage is formed by use of the active energy ray-curing resin composition as described above.

The liquid jet recording head of the present invention uses as the active energy ray-curing resin composition which is the constitutional member of the head a composition having very excellent sensitivity to the active energy ray and resolution as the pattern forming material which are imparted primarily by the half-esterified epoxy resin contained as the essential components in the composition, and it has been rendered possible to obtain a liquid jet recording head excellent in dimensional precision with good yield by use of the active energy ray curing type resin composition.

Also, the active energy ray-curing resin composition for formation of the resin cured film to be used in the present invention utilizes effectively the characteristics of the linear polymer and the half-esterified epoxy resin as the essential components, namely having, in addition to excellent adhesion to a substrate and mechanical strength imparted primarily by the linear polymer, excellent chemical resistance and dimensional stability imparted primarily by the half-esterified epoxy resin, whereby it has been also rendered possible to obtain a recording head having durability for a long term by use of the composition.

Further, when the active energy ray-curing resin composition using the linear polymer having curability is used, it is possible to obtain a liquid jet recording head which is particularly excellent in the adhesiveness, mechanical strength or chemical resistance.

The present invention is described in more detail by referring to the following Synthetic Examples and Examples.

Synthetic Example 1

Solution polymerization of methyl methacrylate, t-butyl methacrylate and dimethylaminoethyl methacrylate (=70/20/10 molar ratio) in toluene gave a linear polymer compound having a weight-average molecular weight of $7.8 \times 10^4$ and a glass transition temperature of 89° C. (this is called LP-1).

On the other hand, a mixture of 200 g of a bisphenol A type Epicrone 855 having an epoxy equivalent of 183–193 (produced by Dainippon Ink Kagaku K.K.), 4 g of triethylbenzylammonium chloride as the catalyst and 0.5 g of hydroquinone as the thermal polymerization inhibitor was elevated in temperature to 80° C. and the reaction was carried out by adding 0.5 equivalent of acrylic acid dropwise per 1 equivalent of the existing epoxy groups. After completion of the dropwise addition of acrylic acid, stirring was further continued for 4 hours to complete the reaction. Thus, an epoxy half-ester having the epoxy groups partially esterified with acrylic acid was obtained (this is called HE-1).

By use of the linear polymer compound LP-1 and the epoxy half-ester HE-1 as prepared above, an active energy ray-curing resin composition was prepared as follows.

| | |
|---|---|
| LP-1 | 100 parts by weight |
| HE-1 | 120 parts by weight |
| Irgacure 651 | 10 parts by weight |
| Crystal Violet | 0.5 parts by weight |
| t-Butylhydroquinone | 0.5 parts by weight |
| 1:1 mixture of MIBK/toluene | 300 parts by weight |

Next, the above resin composition was applied on a polyethylene terephthalate film with a thickness of 16 μm by a wire bar, followed by drying at 100° C. for 20 minutes, to prepare a dry film according to the present invention having a resin composition layer with a film thickness of 75 μm.

EXAMPLE 1

By use of the dry film prepared in Synthetic Example 1, following the steps of FIG. 1 to FIG. 6 as described previously in the specification, an ondemand type liquid jet recording head having 10 orifices (orifice dimension: 75 μm×50 μm, pitch 0.125 mm) with heat generating elements [hafnium boride ($HfB_2$)] as the discharge energy generating element was prepared as follows. The recording head was prepared in number of 30 respectively of the same shape.

First, a plurality of heat generating elements were arranged at the predetermined positions on the substrate comprising silicon and electrodes for applying recording signals were connected thereto.

Next, an $SiO_2$ layer (thickness 1.0 μm) as the protective film was provided on the substrate surface having the heat generating elements arranged thereon, and the surface of the protective layer was cleaned and dried. Then, the dry film with a thickness of 75 μm as shown in the above Synthetic Example heated to 80° C. was laminated on the protective layer at a speed of 0.4 f/min. under the pressurizing condition of 1 Kg/cm².

Subsequently, on the dry film provided on the substrate surface, a photomask having a pattern corresponding to the shape of liquid passages and liquid chamber was srperposed and, after performing registration so that the above element may be provided in the liquid passages to be finally formed, the dry film was exposed to UV-ray with an intensity of 12 mW/cm² from above the photomask for 60 seconds.

Next, the dry film exposed was developed by dipping it in 1,1,1-trichloroethane to remove by disolution the unpolymerized (uncured) portion of the dry film on the substrate, thereby forming grooves which will become finally the liquid passages and liquid chamber with the cured dry film remaining on the substrate.

After completion of development, the cured dry film on the substrate was heated at 150° C. for one hour, followed farther by irradiation of UV-ray with an intensity of 50 mW/cm² for 2 minutes to further cure the film.

After having formed thus the grooves for the liquid passages and liquid chamber with the cured dry film, a flat plate comprising soda glass provided with a thru-hole which becomes the covering over the groove formed was applied with an epoxy type resin adhesive to a thickness of 3 μm by spin coating, then preheated to effect B-staging and plastered on the cured dry film, followed further by main curing of the adhesive to effect adhesion fixing, thus forming a bonded body.

Subsequently, on the downstream side of the liquid passage of the bonded body, namely at the position of 0.150 mm toward the downstream side from the position where tle discharge energy generating element is located, the bonded body was cut vertically relative to the liquid passage by means of a commercially available dicing saw (trade name: DAD 2H/6 model, produced by DISCO Co.) to form orifices for discharging the liquid for recording.

Finally, the cut surfaces were washed and dried, smoothed by polishing, and feeding pipes for feeding the liquid for recording were mounted at the thru-holes to complete the liquid jet recording head. Everyone of the recording heads obtained was found to have liquid passages and liquid chamber which have faithfully reproduced the mask pattern and to be excellent in dimensional precision. The orifice dimension was within 50+5 μm and a orifice pitch within 125+5 μm.

The recording heads thus prepared were tested for quality and durability during prolonged use.

First, for the recording heads obtained, durability test was conducted by dipping them in the liquids for recording having the respective compositions shown below at 60° C. for 1000 hours (the environmental conditions comparable to prolonged use of recording head).

| | |
|---|---|
| (1) H₂O/ethyleneglycol/triethyleneglycol/ triethyleneglycol monomethyl ether/C.I. Food Black 2*¹ (= 67/10/15/5/3 weight parts) | pH = 8.0 |
| (2) H₂O/diethyleneglycol/polyethyleneglycol #400/ N—methyl-2-pyrrolidone/C.I. Direct Yellow 86*² (= 65/10/10/10/5 weight parts) | pH = 9.0 |
| (3) H₂O/ethyleneglycol/diethyleneglycol/poly- ethyleneglycol #400/1,3-dimethyl-2- imidazolidinone/C.I. Food Black 2 (= 55/5/20/10/5/5 weight parts) | pH = 7.0 |
| (4) H₂O/polyethyleneglycol #400/glycerine/C.I. Food Black 2 (= 75/15/5/5 weight parts) | pH = 10.0 |

(Note) *¹ to *² are water-soluble dyes, and sodium hydroxide was employed for adjustment of pH.

For each liquid for recording, five recording heads were provided respectively for the durability test.

After the durability test, each head subjected to the test was observed about the bonded state between substrate and the covering and the dry film. As the result, no peel-off or damage could be recognized to show good adhesiveness in all of the recording heads.

Next, separately for the other 10 recording heads obtained, each head was mounted on a recording device, and the printing test was practiced by use of the above liquid for recording by applying recording signals of 10⁸ pulse continuously on the recording head for 14 hours. For each recording head, immediately after initiation of printing and after elapse of 14 hours, substantially no lowering in both of the discharging performance and printed state can be recognized. Thus, the recording head was found to be excellent in durability.

Comparative Example 1

Recording heads were prepared in the same manner as in Example 1 except for using a commercially available dry film Vacrel with a thickness of 75 μm (trade name of dry film solder mask, produced by Du Pont de Nemours Co.) and a commercially available dry film Photec SR-3000 with a film thickness of 50 μm (trade name, produced by Hitachi Kasei Kogyo K.K.).

For these recording heads, the same durability test as in Example 1 was practiced.

In the course of durability test, when employing Vacrel as the dry film, peel-off was recognized after 100 hours with the liquids for recording (2) and (4). Also, after 300 hours, peel-off was recognized with the liquids for recording (1) and (3).

On the other hand, when employing Photec SR-3000 as the dry film, peel-off was recognized after 300 hours with a respective liquids for recording of (1) to (4).

Synthetic Example 2

By use of the linear polymer compound LP-1 and the epoxy half ester HE-1 obtained in the above Synthetic Example 1, an active energy ray-curing resin composition was prepared as follows.

| | |
|---|---|
| LP-1 | 100 parts by weight |
| HE-1 | 80 parts by weight |
| Aronic M8060*¹ | 120 parts by weight |
| Irgacure 651 | 10 parts by weight |
| Crystal Violet | 0.5 parts by weight |
| t-Butylhydroquinone | 0.5 parts by weight |
| 1:1 mixture of MIBK/toluene | 300 parts by weight |

*¹polyester acrylate (produced by Toa Gosei Kagaku K.K.)

Next, the above resin composition was applied by a wire bar on a polyethylene terephthalate film with a thickness of 16 μm, followed by drying at 100° C. for 20 minutes to prepare a dry film according to the present invention having a resin composition layer with a film thickness of 75 μm.

EXAMPLE 2

By use of the dry film prepared in Synthetic Example 2, following the steps of FIGS. 1 to 6 as described previously in the specification, an on-demand type liquid jet recording head having 10 orifices (orifice dinension: 75 μm×50 μm, pitch 0.125 mm) with heat generating elements [hafnium boride (HfB₂)] as the discharge energy generating element was prepared as follows. The recording head was prepared in number of 30 respectively of the same shape.

First, a plurality of heat generating elements were arranged at the predetermined positions on the substrate comprising silicon and electrodes for applying recording signals were connected to these.

Next, an SiO₂ layer (thickness 1.0 μm) as the protective film was provided on the substrate surface having the heat generating elements arranged thereon, and the surface of the protective layer was cleaned and dried. Then, the dry film with a thickness of 75 μm as shown in the above Synthetic Example 2 heated to 80° C. was laminated on the protective layer at a speed of 0.4 f/min. under the pressurizing condition of 1 Kg/cm².

Subsequently, on the dry film provided on the substrate surface, a photomask having a pattern corresponding to the shape of liquid passages and liquid chamber was superposed and, after performing registration so that the above element may be provided in the liquid passages to be finally formed, the dry film was exposed to UV-ray with an intensity of 12 mW/cm² from above the photomask for 60 seconds.

Next, the dry film exposed was developed by dipping it in 1,1,1-trichloroethane to remove by dissolution the unpolymerized (uncured) portion of the dry film on the substrate, thereby forming grooves which will become finally the liquid passages and liquid chamber with the cured dry film remaining on the substrate.

After completion of development, the cured dry film on the substrate was heated at 150° C. for one hour, followed further by irradiation of UV-ray with an intensity of 50 mW/cm² for 2 minutes to further cure the film.

After having formed thus the grooves for the liquid passages and liquid chamber with the cured dry film, a flat plate comprising soda glass provided with a thruhole which becomes the covering over the groove formed was applied wiih an epoxy type resin adhesive to a thickness of 3 μm by spin coating, then preheated to effect B-staging and plastered on the cured dry film, followed further by main curing of the adhesive to effect adhesion fixing, thus forming a bonded body.

Subsequently, on the downstream side of the liquid passage of the bonded body, namely at the position of 0.150 mm toward the downstream side from the position where the discharge energy generating element is located, the bonded body was cut vertically relative to the liquid passage by means of a commercially available dicing saw (trade name: DAD 2H/6 model, produced by DISCO Co.) to form orifices for discharging the liquid for recording.

Finally, the cut surfaces were washed and dried, further smoothed by polishing, and feeding pipes for feeding the liquid for recording were mounted at the thru-holes to complete the liquid jet recording head. Everyone of the recording heads obtained was found to have liquid passages and liquid chamber which have faithfully reproduced the mask pattern and to be excellent in dimensional precision. The orifice dimension was within $50\pm5$ μm and a orifice pitch within $125\pm5$ μm.

The recording heads thus prepared were tested for quality and durability during prolonged use.

First, for the recording heads obtained durability test was conducted by dipping them in the liquids for recording having the respective compositions shown below at 60° C. for 1000 hours (the environmental conditions comparable to prolonged use of recording head).

| | |
|---|---|
| (1) $H_2O$/diethyleneglycol/polyethyleneglycol #300/ sulfolane/C.I. Direct Blue 86*[1] (= 60/15/10/10/5 weight parts) | pH = 8.0 |
| (2) $H_2O$/diethyleneglycol/polyethyleneglycol #300/propyleneglycol/C.I. Direct Blue 86 (= 62/15/15/5/3 weight parts) | pH = 9.0 |
| (3) $H_2O$/triethyleneglycol/glycerine/C.I. Food Black 2*[2]/Emulgen 931*[4]/PVP K-30*[5] (= 80/15/2/3/0.1/0.1 weight parts) | pH = 7.0 |
| (4) $H_2O$/ethyleneglycol/diethyleneglycol/ propyleneglycol/C.I. Direct Black 154*[3]/ Emulgen 931 (= 64/20/5/5/6/0.2 weight parts) | pH = 10.0 |

(Note) *[1] to *[3] are water-soluble dyes, *[4] is polyoxyethylene nonylphenyl ether produced by Kao Soap K.K. and *[5] is polyvinyl-pyrrolidone produced by GAF, U.S.A.; and sodium hydroxide was employed for adjustment of pH.

For each liquid for recording, 5 recording heads were provided for durability test.

After the durability test, each head subjected to the test was observed about the bonded state between the substrate and the covering and the dry film. As the result, no peel-off or damage could be recognized in all of the recording heads, but good adhesiveness was exhibited.

Next, separately for the other 10 recording heads obtained, each head was mounted on a recording device, and the printing test was practiced by use of the above liquid for recording by applying recording signals of $10^8$ pulse continuously on the recording head for 14 hours. For each recording head, immediately after initiation of printing and after elapse of 14 hours, substantially no lowering in both of the discharging performance of the liquid for recording and printed state can be recognized. Thus, the recording heads were found to be excellent in durability.

We claim:

1. A liquid jet recording head, having a liquid passage communicated to the discharging outlet of the liquid provided on a substrate surface, said passage being formed by subjecting a layer of a resin composition curable with an active energy ray to a predetermined pattern exposure with the use of said active energy ray to thereby form a cured region of said resin composition and removing the uncured region from said layer, said resin composition comprising:
   (i) a linear polymer having a glass transition temperature of 50° C. or higher and a weight-average molecular weight of about $3.0\times10^4$ or more; and
   (ii) an epoxy resin comprising at least one compound having two or more epoxy groups in the molecule, the epoxy groups existing in said epoxy resin being partially esterified with an unsaturated carboxylic acid.

2. A liquid jet recording head according to claim 1, wherein said component (ii) is a resin obtained by esterifying 0.30–0.70 equivalent, out of every equivalent of the epoxy groups present in said epoxy resin.

3. A liquid jet recording head according to claim 2, wherein said component (ii) is a resin obtained by esterifying 0.45–0.55 equivalent, out of every equivalent of the epoxy groups present in said epoxy resin.

4. A liquid jet recording head according to claim 1, wherein said resin composition contains said linear polymer (i) in an amount of 20 to 80 parts by weight and said resin (ii) in an amount of 80 to 20 parts by weight.

5. A liquid jet recording head according to claim 1, wherein said resin composition further comprises a radical polymerization initiator, to be activated by the effect of an active energy ray, in an amount of 0.1 to 20 parts by weight, with respect to 100 parts by weight in total, of said linear polymer (i) and said resin (ii).

6. A liquid jet recording head according to claim 1, wherein said resin composition further comprises a photosensitive aromatic onium salt compound containing an element of the group VIa or Va of the periodic table in an amount of 0.2 to 15 parts by weight, with respect to 100 parts by weight in total of said linear polymer (i) and said resin (ii).

7. A liquid jet recording head, having a liquid passage communicated to the discharging outlet of the liquid provided on a substrate surface, said passage being formed by subjecting a layer of a resin composition curable with an active energy ray to a predetermined pattern exposure with the use of said active energy ray to thereby form a cured region of said resin composition and removing the uncured region from said layer, said resin composition comprising:
   (i) a linear polymer having a glass transition temperature of 50° C. or higher and a weight-average molecular weight of about $3.0\times10^4$ or more;
   (ii) an epoxy resin comprising at least one compound having two or more epoxy groups in the molecule, the epoxy groups existing in said epoxy resin being partially esterified with an unsaturated carboxylic acid; and
   (iii) a monomer having an ethylenically unsaturated bond.

8. A liquid jet recording head according to claim 7, wherein said resin composition contains said linear polymer (i) in an amount of 20 to 80 parts by weight and said resin (ii) and said monomer (iii) in a total amount of 80 to 20 parts by weight.

9. A liquid jet recording head according to claim 7, wherein the ratio of amounts of said resin (ii) and said monomer (iii) is in a range from 30:70 to 70:30.

10. A liquid jet recording head according to claim 7, wherein said resin composition further comprises a radical polymerization initiator to be activated by the effect of the active energy ray in an amount of 0.1 to 20 parts by weight with respect to a total amount of 100 parts by weight of said linear polymer (i), said resin (ii) and said monomer (ii).

11. A liquid jet recording head according to claim 7, wherein said resin composition further comprises a photosensitive aromatic onium salt compound containing an element of the group VIa or Va of the periodic table, in an amount of 0.2 to 15 parts by weight, with respect to a total amount of 100 parts by weight of said linear polymer (i), said resin (ii) and said monomer (iii).

* * * * *

UNITED STATES PATENT AND TRADEMARK OFFICE
CERTIFICATE OF CORRECTION

PATENT NO. : 4,688,052
DATED : August 18, 1987
INVENTOR(S) : TADAYOSHI INAMOTO, ET AL.

It is certified that error appears in the above-identified patent and that said Letters Patent is hereby corrected as shown below:

COLUMN 2

Line 28, "as" should read --at--.

COLUMN 3

Line 23, "invnetion" should read --invention--.

COLUMN 5

Line 52, "monomcr" should read --monomer--.

COLUMN 6

Line 64, "course possible." should read --course, possible.--.

COLUMN 8

Line 41, "compound" should read --compounds--.

COLUMN 9

Line 2, "(iii)" should read --(ii)--.

COLUMN 11

Line 14, "for." should read --for--.

UNITED STATES PATENT AND TRADEMARK OFFICE
CERTIFICATE OF CORRECTION

PATENT NO. : 4,688,052
DATED : August 18, 1987
INVENTOR(S) : TADAYOSHI INAMOTO, ET AL.

It is certified that error appears in the above-identified patent and that said Letters Patent is hereby corrected as shown below:

COLUMN 12

Line 10, "may d" should read --d may--.
Line 63, "caploractone-modified" should read --caprolactone-modified--.

COLUMN 14

Line 27, "group VIa" should read --group Va--.
Line 38,

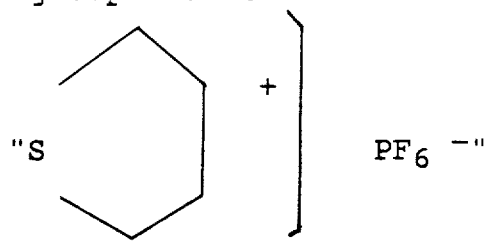

should read

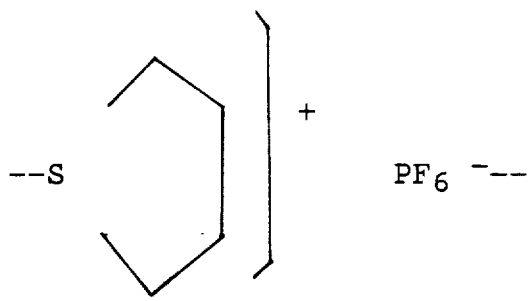

UNITED STATES PATENT AND TRADEMARK OFFICE
CERTIFICATE OF CORRECTION

PATENT NO. : 4,688,052

DATED : August 18, 1987

INVENTOR(S) : TADAYOSHI INAMOTO, ET AL.

It is certified that error appears in the above-identified patent and that said Letters Patent is hereby corrected as shown below:

COLUMN 18

Line 2, "promotors," should read --promoters,--.
    Line 10, "pravent" should read --prevent--.
    Line 15, "promotor," should read --promoter,--.
    Line 41, "is" should read --are--.

COLUMN 19

Line 31, "I" should read --1--.
    Line 55, "sclvent" should read --solvent--.

COLUMN 20

Line 35, "fcr" should read --for--.

COLUMN 21

Line 58, "Irgacure 651" should read --Irugacure 651--.

COLUMN 22

Line 5, "ondemand" should read --on-demand--.
    Line 27, "srperposed" shoud read --superposed--.
    Line 40, "farther" should read --further--.
    Line 55, "tle" should read --the--.

UNITED STATES PATENT AND TRADEMARK OFFICE
CERTIFICATE OF CORRECTION

PATENT NO. : 4,688,052         Page 4 of 5
DATED       : August 18, 1987
INVENTOR(S) : TADAYOSHI INAMOTO, ET AL.

It is certified that error appears in the above-identified patent and that said Letters Patent is hereby corrected as shown below:

COLUMN 23

Line 2, "a" should read --the--.
Line 11, insert table heading --Liquid components for recording--.
Line 35, "reccrding" should read --recording--.
Line 61, "a" should read --the--.

COLUMN 24

Line 4, "Irgacure 651" should read --Irugacure 651--.
Line 21, "dinension:" should read --dimension:--.
Line 62, "wiih" should read --with--.

COLUMN 25

Line 13, "reprcduced" should read --reproduced--.
Line 14, "dimensicnal" should read --dimensional--.
Line 15, "a" should read --the--.
Line 17, "duratility" should read --durability--.
Line 18, "obtained durability" should read --obtained, durability--.
Line 24, insert table heading --Liquid components for recording--.

UNITED STATES PATENT AND TRADEMARK OFFICE
CERTIFICATE OF CORRECTION

PATENT NO. : 4,688,052

DATED : August 18, 1987

INVENTOR(S) : TADAYOSHI INAMOTO, ET AL.

Page 5 of 5

It is certified that error appears in the above-identified patent and that said Letters Patent is hereby corrected as shown below:

<u>COLUMN 26</u>

Line 41, "cr" should read --or--.
    Line 60, "monomer (ii)." should read --monomer (iii).--.

Signed and Sealed this

Eighth Day of March, 1988

Attest:

DONALD J. QUIGG

*Attesting Officer*       *Commissioner of Patents and Trademarks*